US012605913B2

(12) United States Patent
Böhnlein et al.

(10) Patent No.: US 12,605,913 B2
(45) Date of Patent: Apr. 21, 2026

(54) PRESSURE ROLLER STATION FOR ROTARY PRESSES HAVING EXTERNAL AXLE RECEPTACLES FOR PRESSURE ROLLER UNITS

(71) Applicant: Korsch AG, Berlin (DE)

(72) Inventors: Jürgen Böhnlein, Berlin (DE); Peter Weisbach, Berlin (DE); Ingo Klaer, Berlin (DE); Stephan Mies, Berlin (DE)

(73) Assignee: Korsch AG, Berlin (DE)

( * ) Notice: Subject to any disclaimer, the term of this patent is extended or adjusted under 35 U.S.C. 154(b) by 581 days.

(21) Appl. No.: 17/771,262

(22) PCT Filed: Oct. 28, 2020

(86) PCT No.: PCT/EP2020/080231
§ 371 (c)(1),
(2) Date: Apr. 25, 2022

(87) PCT Pub. No.: WO2021/083929
PCT Pub. Date: May 6, 2021

(65) Prior Publication Data
US 2022/0410518 A1 Dec. 29, 2022

(30) Foreign Application Priority Data
Oct. 30, 2019 (EP) .................................... 19206134
Jan. 24, 2020 (EP) .................................... 20153512

(51) Int. Cl.
*B30B 11/08* (2006.01)
*B30B 1/26* (2006.01)
*B30B 15/00* (2006.01)

(52) U.S. Cl.
CPC .............. *B30B 11/08* (2013.01); *B30B 1/263* (2013.01); *B30B 15/0076* (2013.01)

(58) Field of Classification Search
USPC .......................................................... 425/325
See application file for complete search history.

(56) References Cited

U.S. PATENT DOCUMENTS 1,757,370 A 5/1930 Kilian
2017/0050401 A1* 2/2017 Klaer ...................... B30B 11/08
2017/0080662 A1* 3/2017 Carstens .................. B07C 5/18

FOREIGN PATENT DOCUMENTS

DE 19705092 3/1998
JP H0819899 1/1996
(Continued)

*Primary Examiner* — Susan D Leong
*Assistant Examiner* — Xinwen Ye
(74) *Attorney, Agent, or Firm* — Chambliss, Bahner & Stophel, P.C.; Stephen D. Adams

(57) ABSTRACT

The invention preferably relates to a compression roller station for rotary tableting machines with a guide profile which can be locked to the rotary tableting machine and comprises two side surfaces on which a pair of upper and lower shaft mountings for compression roller shafts are arranged externally in each case, so that two pairs of compression rollers can be attached to the same guide profile. In preferred embodiments, the shaft mountings have a laterally outwardly open shape, particularly preferably a u-shape, and are arranged for a swivelable mounting of compression roller shafts. In a further aspect, the invention relates to a rotary tableting machine comprising such a preferred compression roller station.

14 Claims, 7 Drawing Sheets

(56) References Cited

FOREIGN PATENT DOCUMENTS

Figure 1:
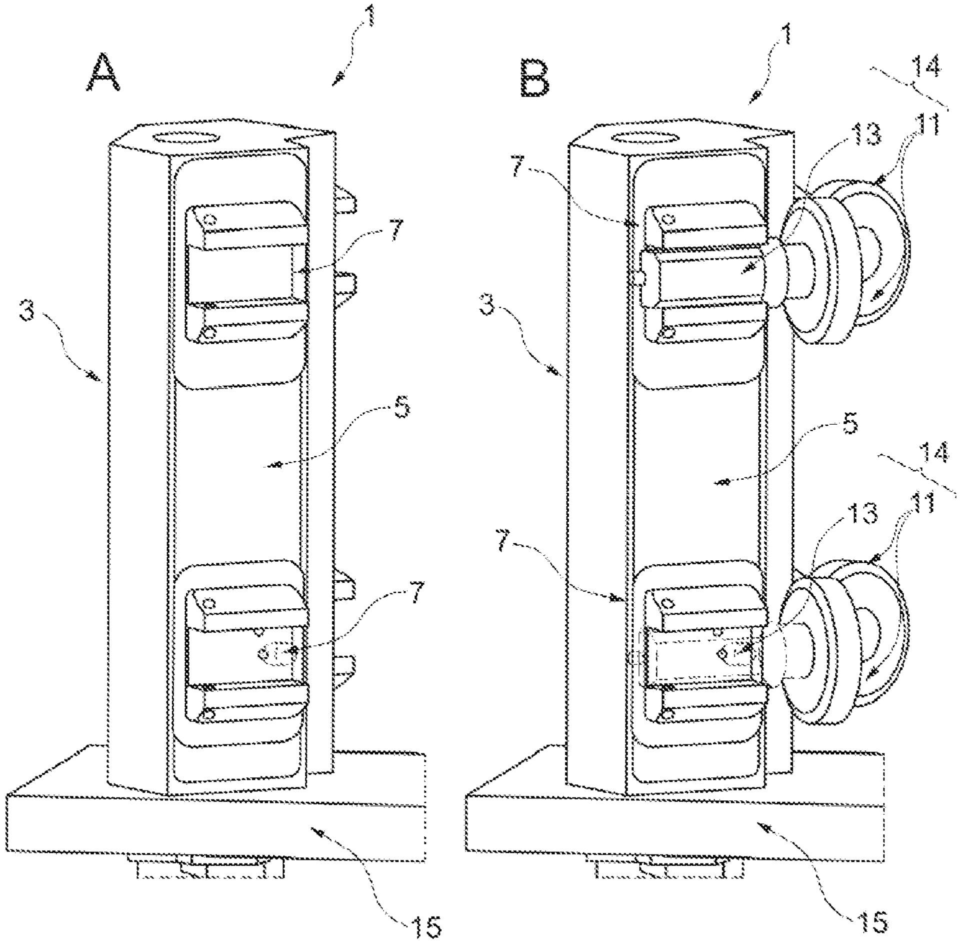

| | | | | | |
|---|---|---|---|---|---|
| JP | H0819899 | A | * | 7/1996 | |
| JP | 2006263764 | | | 5/2006 | |
| JP | 2006263764 | A | | 10/2006 | |
| JP | 2009297780 | A | * | 12/2009 | |
| WO | WO 2015169852 | | | 11/2015 | |
| WO | WO-2017002561 | A1 | * | 1/2017 | ........... B30B 11/005 |
| WO | WO 2018109813 | | | 6/2018 | |
| WO | WO-2019150713 | A1 | * | 8/2019 | |
| WO | WO-2019203630 | A1 | * | 10/2019 | |

* cited by examiner

A

B

A

B

A

B

PRESSURE ROLLER STATION FOR ROTARY PRESSES HAVING EXTERNAL AXLE RECEPTACLES FOR PRESSURE ROLLER UNITS

The invention preferably relates to a compression roller station for rotary tableting machines with a guide profile which can be locked to the rotary tableting machine and comprises two side surfaces on which a pair of upper and lower shaft mountings for compression roller shafts are arranged externally in each case, such that two pairs of compression rollers can be attached to the same guide profile. In preferred embodiments, the shaft mountings have a laterally outwardly open shape, particularly preferably a U-shape, and are arranged for a swivelable mounting of compression roller shafts. In a further aspect, the invention relates to a rotary tableting machine comprising such a preferred compression roller station.

BACKGROUND AND PRIOR ART

The invention relates to the field of rotary tableting machines, which are used in the pharmaceutical, technical or chemical industry or in the food industry to produce tablets or pellets from powdered materials in large quantities.

It is known that rotary tableting machines have a turret which carries a plurality of pairs of punches, each pair of punches being formed by an upper punch and a lower punch which are adjustable relative to one another. The turret comprises a die table in which die openings are provided at regular intervals on a reference circle, in which the upper and lower punches either cooperate directly, or which have sleeve-shaped insert pieces, referred to as dies. The material to be compressed is filled into these dies or die openings by means of a filling device.

When, due to the rotation of the turret, a pair of punches enters the area of the die or die opening filled in this way, the two punches are moved towards each other by cams and enter the area of a compression roller station. In the compression roller station, the punches are pressed against each other such that the material in the die opening is compressed into a tablet, for example. After completion of the compression process, both punches are moved upwards and the tablet is ejected from the die opening or the die. The compressive force is transmitted to the pressing tools by means of compression rollers. The pressing tools are also referred to as upper and lower punches.

In the prior art, rotary tableting machines are also known in which the compression rollers are mounted separately from one another, for example at the top on a head piece and at the bottom on a carrier plate in the base of the rotary tableting machine. For example, in EP 1 627 727 B1, an upper compression roller is attached to an upper crosshead, while a lower compression roller is attached separately to a lower crosshead of the machine housing.

The disadvantage of a separate arrangement of the two compression rollers is that the compressive forces generated during the compression process are transmitted directly to both the upper and the lower machine housing. The machine housing of the rotary tableting machine can consist, for example, of a machine base on which the carrier plate for the lower compression roller is located and a head piece to which the upper compression roller is attached. The head piece and the machine base must be connected to each other by 2 to 4 corner bars. In order to withstand the compressive forces, the head piece, the corner beams and the machine base must be manufactured very solidly with a high material cost.

In addition, it has been shown that machine housings emit considerable structure-borne sound vibrations in the audible range when the upper and lower compression rollers are mounted separately. Thus, at high rotational speeds of the turrets of a rotary tableting machine, sound pressure levels of more than 100 dBA can be generated.

To avoid these disadvantages, prior art compression roller stations with guide profiles or guide columns have been proposed, which are suitable for holding a compression roller pair consisting of an upper and a lower compression roller.

Such compression roller stations are known in the prior art, for example, from documents EP 0 856 394 B1 or EP 0 856 394 B1.

EP 0 856 394 B1 discloses a compression roller station for a rotary tableting machine, wherein the compression roller station has a frame which can be locked to the rotary tableting machine and comprises two bearing blocks for the compression rollers. The frame is formed from a guide column, and the bearing blocks are arranged on upper and lower compression roller mountings which are guided by the guide column and are adjustable relative to one another. Preferably, the guide column is cylindrical, and the compression roller mountings are preferably designed as circular or tapered openings for receiving the bearing blocks or compression roller shafts.

EP 0 856 394 B1 also discloses a rotary tableting machine with a compression roller station consisting of a solid guide column with a cylindrical cross section. To reduce noise, the rotary tableting machine according to EP 0 856 394 B1 comprises a solid, flexurally and torsionally rigid base plate to accommodate the turret, the drive system and the compression roller station. Here, the carrier plate is held by a base frame of the rotary tableting machine by means of elastic bearings, so that the rotary tableting machine can operate with low vibration and noise even at high compressive forces.

Modern rotary tableting machines are characterized by the fact that, starting from a basic configuration for the production of single-layer tablets, the basic tableting machine can be converted by adding additional modules so that double-layer, triple-layer or core-coated tablets can also be compressed. These additional modules can be, for example, additional compression stations. It has also been shown that the quality of single-layer tablets can be improved if, prior to the actual tablet production, the compression material is de-aerated in a so-called pre-compression station, which is also formed by a pair of compression rollers.

It is thus desirable to provide rotary tableting machines which integrate several compression stations, for example a pre-compression station and a main compression station, whereby a flexible design is preferred in order to allow different operating statuses depending on the desired application.

From WO 2018/109813 A1 a rotary tableting machine is known with a pre-compression station and a main compression station each comprising two pairs of compression rollers, which are attached to a vertical carrier profile. Also in a rotary tableting machine according to JP 2006 263764 A, two pairs of compression rollers for example for a pre-compression station and a main compression station can be installed on a vertical carrier profile. The rotary tableting machine has an upper carrier and a carrier plate. The upper carrier is only supported at the rear by the carrier profile, such that better access to the turret is provided at the front.

The carrier profile for the compression rollers is characterized by a v-shaped front surface facing the turret, on which the two pairs of compression rollers can be arranged side by side on the turret circle. The compression roller shafts are located inside the vertical carrier when installed. This makes it more difficult to gain access to change over the compression rollers. In addition, the carrier profile for installing the two pairs of compression rollers takes up a relatively large amount of space and is therefore an obstacle to flexible positioning around the turret.

For some applications, it may be preferred that individual compression stations can be located at different positions within the rotary tableting machine to allow for quick and easy changeover.

In the compression station of EP 0 856 394 B1 or EP 0 856 394 B1 with compact cylindrical guide columns, it is known that a carrier plate of the rotary tableting machine has a plurality of recesses. Each of these recesses is equipped with a clamping device with which a compression station can be fixed at the desired position.

In order to make particularly effective use of the cost-intensive clamping devices, it has been proposed in the prior art to integrate support or holding devices in the individual compression stations themselves (WO 2016/156306 A1). In this way, depending on a desired operating mode, a particularly low-maintenance and simple fastening of compression roller stations at predetermined positions on a carrier plate can be achieved.

In addition to a conversion for different applications, it is also necessary to remove the compression roller station from the interior of the tableting machine for maintenance or cleaning in the case of conventional rotary tableting machines. Particularly in the case of compression roller stations which comprise closed guide columns, it is necessary to move or swivel the station as a whole on the carrier plate for this purpose. Due to the high total weight of a single compression roller station of up to 500 kilograms, this must sometimes be supported by lifting equipment.

In order to ensure improved accessibility of compression roller station components requiring maintenance or replacement, an open guide profile was proposed in WO 2015/169852 A1. Even in these cases, it is usually necessary to move or replace the entire compression roller station for a change of operation.

Another disadvantage of the known compression stations is the increased spatial requirement, especially when using several compression roller stations, for example for the production of two-layer, three-layer, or even core-coated tableting machines. When using a pre-compression station in addition to a main compression station, it is also necessary to arrange two compression roller stations next to each other, which increases the footprint.

When several individual compression stations are used, independent oscillations or vibration can also occur. Although the suspension of the upper and lower compression rollers in a compression roller station ensures extremely stable absorption of the compressive forces, vibrations are nevertheless transmitted to the individual compression roller stations, which can increase in opposite directions. This can be counteracted by connecting the individual compression roller stations by means of struts. However, the use of struts is associated with additional design complexity.

In light of the prior art, there is thus potential for improvement in the provision of rotary tableting machines with one or more compression roller stations in a compact design, which can also preferably be simply and quickly converted for different application purposes.

OBJECTIVE OF THE INVENTION

One objective of the invention was therefore to provide a compression roller station for rotary tableting machines which eliminates the disadvantages of the prior art. In particular, it was an objective of the invention to develop a compression roller station which is characterized by a compact design, multifunctional application possibilities and a high level of stability with low noise generation.

SUMMARY OF THE INVENTION

According to the invention, the objective is solved by the independent claims. The dependent claims represent preferred embodiments of the invention.

In a preferred embodiment, the invention relates to a compression roller station for rotary tableting machines with a guide profile which can be locked to the rotary tableting machine, wherein the guide profile comprises two side surfaces on which a pair of upper and lower shaft mountings for compression roller shafts are arranged externally in each case, so that two pairs of compression rollers can be attached to the same guide profile.

The compression roller station is characterized by its extremely compact design for accommodating up to four compression rollers. This means, for example, that a main compression station and a pre-compression station can be provided in a very confined space. In known compression roller stations, this usually required at least two separate guide profiles or guide columns, which had to be set up next to each other around a turret circle.

By attaching the shaft mountings to the two side surfaces of a guide profile, it is possible to provide two pairs of compression rollers in each case, with their spatial requirements dictated only by the extension of the compression rollers themselves.

However, the design method according to the invention not only reduces the space required, but also significantly increases their stability.

On the one hand, the arrangement of pairs of upper and lower shaft mountings ensures a high capacity to absorb compressive forces generated by the compression rollers installed in the shaft mountings. Since the pairs are each located on a side surface, this can compensate particularly effectively for the opposing compressive forces. In addition, it has been shown that transverse forces or vibrations between the two pairs of compression rollers installed on the side surfaces of a guide profile are also compensated.

Whereas the known use of two or more individual compression stations in a rotary tableting machine can lead to undesirable vibrations or vibration interference, the attachment of both compression roller pairs to a guide profile prevents this by design. Instead, the compression roller station exhibits excellent overall stability even with independent compression processes by means of laterally mounted compression roller pairs.

With the compression roller station, it is thus possible to provide two pairs of compression rollers or compression units acting independently of each other in a confined space, which exhibit a low amount of vibration and oscillation and only generate a small amount of noise even with high compressive forces.

In a preferred embodiment, the compression roller station is characterized in that a first pair of lower and upper compression rollers are attached to a first side surface of the guide profile, forming a pre-compression station, and a second pair of lower and upper compression rollers are attached to a second side surface, forming a main compression station.

The terms pre-compression station and main compression station have the conventional meaning as used in the prior art and preferably respectively comprise pairs of compression rollers for conveying a compressive force to the pressing tools. Typically, in a so-called pre-compression station, de-aeration of the compression material is ensured prior to actual tablet production by compressing the material in the main compression station. This allows the quality assurance of the compressed tablets to be increased. As a rule, the pre-compression station is thus characterized by low insertion depths and/or compressive forces compared to the main compression station.

With the compression roller station according to the invention, the components for a main compression station as well as a pre-compression station can be accommodated more advantageously in a very small space, as a result of which rotary tableting machines with extremely small dimensions can be constructed.

Compared to the known prior art, the possibility of integrating two pairs of compression rollers in one compact compression station represents a special achievement that distinguishes the compression roller station for a wide variety of applications.

In laboratory operation, for example, it is often desirable to be able to run various test series—for feasibility studies or screening purposes, for example—with a small footprint. By means of a compression roller station for the flexible integration of up to four compression rollers, a rotary tableting machine with maximum functionality can be provided on a minimum footprint. This makes it possible to integrate both the pre-compression and main compression stations and to provide two compression rollers for multilayer operation within one compression roller station.

The attachment of the shaft mountings for the compression rollers on the external side surfaces also ensures good accessibility. This means that different compression rollers can be mounted or unmounted quickly and easily as required. It is not necessary to install or remove the entire compression roller station for this purpose. Instead, the compression roller shafts can be installed and removed in the freely accessible shaft mountings at the side. The provision of swiveling compression roller shafts for maintenance or replacement is also made possible by the lateral provision of the shaft mountings. The compression roller station thus allows a particularly high degree of flexibility for the needs-based use of modern rotary tableting machines.

Within the meaning of the invention, a shaft mounting preferably designates a component which is designed to support a compression roller shaft or a bearing shaft for other components of a rotary tableting machine in the guide profile.

For this purpose, the shaft mountings preferably comprise a mounting section or mounting surface for locking a compression roller or bearing shaft and a bearing section or bearing block for guiding the shaft mounting within the guide profile. Preferably, the bearing section is located within the guide profile, for example on guide rails. The mounting section or mounting surface, on the other hand, faces laterally outwards and is therefore easily accessible.

The shaft mountings are preferably monolithic in order to withstand the highest loads as solid components, but composite shaft mountings are also conceivable. Because of its preferred suitability for mounting compression roller shafts, the shaft mounting can also be referred to as a compression roller mount.

For mounting and unmounting, it is preferred that the shaft mounting or its mounting section has a laterally open profile, whereby these can have, for example, a u-shaped, arc-shaped, v-shaped, trapezoidal or other open polygonal shape in cross-section. The receiving surface can preferably be adapted to the shape of the compression roller shafts or bearing shafts to be installed. Alternatively, however, the shaft mounting can also have laterally closed profiles, for example it is conceivable to provide a mounting section with a socket with, for example, a rectangular or circular, cross-section for the insertion of the compression roller shafts. A fixing plate with corresponding locking means for the installation of compression roller shafts is also conceivable.

In preferred embodiments, the shaft mountings are of identical design in order to attach a particularly simple bearing shaft of identical design with possibly different compression rollers to the different shaft mountings. However, it may also be preferred that the shaft mountings differ from each other. For example, the pair of shaft mountings on one respective side surface could be identical in construction but different from the shaft mountings on the other side surface. Also, upper and lower axis receptacles on the respective side surfaces could be identically constructed but different from their counterpart, or three shaft mountings could be identical, while a fourth shaft mounting has a special function.

The shaft mountings thus mediate the attachment of the compression roller shafts to the guide profile, whereby the shaft mountings themselves are preferably mounted movably in the guide profile.

The guide profile preferably represents the basic frame or the support structure of the compression roller station and serves to support or guide the shaft mountings. Preferably, the guide profile has the form of a column. The terms guide profile and guide columns are preferably used synonymously.

Typically, the guide profile is thus a free-standing carrier element or carrier column with a vertical height that allows the simultaneous attachment of a pair of upper and lower compression rollers.

By mounting the shaft mountings of a pair of upper and lower compression rollers within a guide profile or guide column, the compressive forces occurring in the compression process preferably remain in the guide column. Preferably, the compressive forces occurring in the compression process can be absorbed by the respective adjustment spindles themselves, which steplessly adjust the height of the upper and lower compression rollers. As a result, the effective compressive forces remain within the guide column and do not enter the carrier plate or the machine housing. This prevents the entire frame of the tableting machine from being exposed to the compressive forces during the compression process. This allows a less solid design of the base and the saving of material. Furthermore, the frame components, such as the head plate, multifunctional column and base, are not excited to create vibrations which, if the frequencies are in the audible range, can lead to noise pollution.

To absorb the compressive forces, the guide profile is preferably designed as a solid component. For example, it can be made from cast metal.

The height of the guide profile is determined by the desired distance between the upper and lower compression rollers, whereby the guide profile preferably has lower and upper openings in the side surfaces to accommodate the shaft mountings.

In cross-section, the guide profile is preferably characterized by the presence of two side surfaces, which are preferably not parallel or perpendicular to each other. Instead, the side surfaces preferably comprise an angle, which is preferably selected so that pairs of compression rollers attachable to the side surfaces act on a turret reference circle.

The cross-section of the guide profile can thus preferably resemble a circular ring segment in sections, with the two side faces forming the legs. The front and rear sides of the guide profile can—like a circular ring segment—be designed as a circular arc. In this case, the front side facing the turret will have a smaller radius than the rear side facing away from the turret.

Particularly preferably, the design of the front and rear faces is sectionally rectilinear in cross-section and traces an arc of a circle. The front side of the guide profile facing the turret can, for example, have two surfaces that are at an angle to one another, while the rear side facing away from the turret is formed by three surfaces. Likewise, it is conceivable that the front and rear faces are formed in cross-section as a straight connecting line between side faces, such that the front and rear faces each form a flat surface.

In its inner cross-section, the guide profile is preferably not solid, but has cavities for guiding the shaft mountings and possibly other components. The stability of the guide pillar is thus largely determined by the side surfaces as well as the front and rear sides and preferably a divider. Inner stabilizing walls or struts which connect the front, rear and/or side surfaces with each other (divider) are preferred and lead to a more even distribution of the compressive and flexural forces.

The guide profile preferably has a front surface facing the turret, a rear surface facing away from the turret, and at least two side surfaces on the outside of which the shaft mountings are located.

In a preferred embodiment of the invention, the at least two side faces form legs of an angle which lies in the range from 10° to 120°, preferably from 20° to 80°. Intermediate ranges from the aforementioned ranges may also be preferred, such as 10° to 20°, 20° to 30°, 30° to 40°, 40° to 50°, 50° to 60°, 60° to 70°, 70° to 80°, 80° to 90°, 90° to 100°, or even 110° to 120°. A person skilled in the art will recognize that the aforementioned range limits can also be combined to obtain other preferred ranges, such as 30° to 60°, 20° to 70°, or 50° to 80°.

Preferably, the side faces form the legs of an angle, wherein the side faces do not have a common contact edge. Instead, the side faces may instead form the legs of an imaginary circular ring segment, with the side faces being connected by a front face and rear face. As explained above, the front face and rear face may be angular, multi-surface or round, arcuate in shape.

The angle is preferably determined by the desired turret reference circle and the dimensions of the compression roller shafts and compression rollers. If pairs of compression rollers are arranged on both sides of the side surfaces—for example to provide a pre-compression station and a main compression station—they should preferably be arranged in such a way that both pre-compression and main compression rollers are centered over the turret reference circle of the punches or die sockets. In the case of very small, i.e. acute angles, the compression rollers may not fit next to each other or would touch each other. For very large, i.e. obtuse angles, the compression roller station will cover a large part of the turret circle.

The preferred orientation of the side faces of the guide profile can alternatively be indicated by the normal vectors, which are located on the side faces.

In a preferred embodiment of the invention, the guide profile is characterized in that the normals standing on the at least two side surfaces respectively form tangents to a circle whose diameter can preferably be selected to be larger than a diameter of a turret of the rotary tableting machine. The normals to the side surfaces are usually understood as vectors perpendicular to the surfaces, the origin of which lies in the center of the side surfaces.

It should be noted that the circle to which the side surfaces are preferably perpendicular does not correspond to the turret reference circle on which the attached compression rollers act. Rather, the circle defined by the side faces will preferably be larger than the turret reference circle because the compression rollers are installed from the side faces inward toward the turret. For example, the circle formed by the normal vectors can have a larger diameter by about half the length of the compression roller shaft or more (see e.g. FIG. 2).

In a preferred embodiment of the invention, the upper and lower shaft mountings are present in the guide profile on the respective side surfaces so as to be adjustable with one another and/or against one another. For this purpose, for example, guide rails can be present within the guide profile, on which the pairs of shaft mountings can be moved with each other and/or against each other, e.g. by means of adjusting spindles and a drive motor.

It is particularly preferred that the upper and lower shaft mountings of the respective pairs are individually and independently adjustable vertically, i.e. along the height of the guide profile.

For example, it may be preferable to use an adjustment drive to adjust the respective upper shaft mounting or upper compression roller and thus the insertion depth of an upper punch acted upon by the upper compression roller.

It may also be preferable to adjust the lower shaft mounting or lower compression roller relative to the upper shaft mounting or upper compression roller in order to set the height of the tablets to be produced according to predetermined values.

Furthermore, the upper and lower compression roller mountings can advantageously be adjusted not only independently of each other, but also together. The parallel adjustment of the two shaft mountings at the same distance from each other enables compression zone adjustment. In this way, the area within a die opening, in which the compression of the powdered compression material takes place, can be varied. On the one hand, such a compression zone adjustment can be used to pass through different positions of the inside of the die sleeve in order to stress and wear it equally. In addition, the vertical adjustability of the compression zones is advantageous for the precise compression of different layers in a multilayer tablet.

In a further embodiment of the invention, guide rails are present within the guide profile, on which the upper and lower axis mountings are vertically movable with and/or against each other. For this purpose, the guide rails and the shaft mountings (or their bearing section) are preferably precisely matched to one another. For example, a dovetail guide may be preferred to minimize lateral clearance.

In terms of design, it may be preferable for the upper and lower shaft mountings to be arranged on a common sliding guide plane, which is defined by the guide rails. The shaft mountings slide, for example, as guide carriages on the common sliding guide plane. Preferably, flat guides can be used as sliding bearings, which are designed with particularly preferred clearance adjustment. By minimizing the guide clearance, increased precision can be achieved in the guidance of the shaft mountings and thus in the positioning of the compression rollers.

The shaft mountings are preferably adjusted in the guide profile by means of adjusting drives, with adjusting spindles being particularly preferred.

In a preferred embodiment of the invention, the compression roller station comprises adjusting spindles which are present within the guide profile for moving the shaft mountings. The adjusting spindles can preferably be threaded spindles, in particular ball screw spindles, with the shaft mountings being mounted on these as sliding guide carriages. The vertical position of the shaft mountings and thus of the compression rollers can be set particularly precisely by means of a rotational movement of the adjusting spindles.

For example, a rotary motor can be used together with a transmission to implement the rotary movement. In conventional compression roller stations, the adjustment spindles are located together with the rotary motors within the compression roller station itself, so that no connections have to be loosened when the compression roller station is moved and/or removed. This is advantageously not necessary due to the laterally accessible compression roller mountings or shaft mountings.

Instead, the compression roller station can be permanently installed on a carrier plate. In addition to the advantages of simplified maintenance and changeover already described, this also allows motors or their transmissions to be installed in a practical manner outside the compression roller station.

In a preferred embodiment of the invention, there is no motor for adjusting the compression roller mountings within the guide profile of the compression roller station. Instead, the motors and, if necessary, their transmissions for adjusting the shaft mountings can be installed outside the compression roller station, for example underneath the carrier plate. By removing the motors, the space required for the compression roller station itself can be reduced even further.

The mounting of the shaft mountings on the side surfaces of a guide profile already results in simplified access for assembly purposes. In this respect, it has proved particularly advantageous to use shaft mountings that have a laterally outwardly open shape. Laterally outwardly open preferably refers to the guide profile and means that lateral removal and/or swiveling of the mounted compression roller shaft is possible.

For this purpose, it is preferred that the shaft mountings have an opening laterally outwards (i.e. in the direction facing away from the side surfaces) through which the compression roller shafts can be inserted or removed laterally.

In order to be able to absorb the compressive forces, the mounting surface preferably has mating surfaces both upwards and downwards. There is also preferably a boundary towards the inside (i.e. in the direction facing the guide profile), against which the compression roller shafts can be attached in a force-fitting and/or form-fitting manner.

In a particularly preferred embodiment, the shaft mountings have a u-shaped mounting surface in cross section so that a cuboid compression roller axis can be locked in the shaft mountings in a force-fitting and/or form-fitting manner. The u-shape is preferably laterally outwardly open within the meaning of the above description. Such a u-shape is particularly suitable for mounting and fixing substantially cuboid compression roller shafts or cuboid bearing shafts for other components of a tableting machine. In the locked state, the cuboid shafts are located on three boundary surfaces: an upper side, a lower side and an inner side (to the guide profile). Particularly preferably, the upper side and the lower side are parallel to each other and are each at a right angle to the inner side. The transitions or corners can be beveled or rounded. The u-shape ensures that compressive forces acting in particular upwards and downwards are absorbed stably in the shaft mounting. In addition, rotational clearance of a compression roller shaft in the shaft mounting can be reliably prevented with low wear. The term u-shaped preferably also includes an essentially straight u-shape with possibly sloping or rounded corners.

In addition to the preferred u-shape, other laterally outwardly open profiles may be preferred, such as arc-shaped, semi-circular, v-shaped, trapezoidal, or other open polygonal shapes.

In a further preferred embodiment, the shaft mounting has means for a laterally outwardly swivelable mounting of a compression roller shaft. Preferably, the shaft mounting is designed in such a way that, when the compression roller shaft is installed, the center of rotation is located in a rear region of the shaft mounting and thus outside the guide profile.

For example, the shaft mounting can have opposing bores in a rear area so that a compression roller shaft or bearing shaft can be mounted rotatably or swivelably by means of a pivot pin. Preferably, the compression roller shaft or bearing shaft has corresponding sockets for the pivot pin. The center of rotation of the compression roller shaft is preferably determined by the sockets for receiving the pin. Other design variants for swivel joints are also conceivable, whereby their rotational point is likewise preferably to be arranged in a rear region of the shaft mounting in order to enable simple swiveling of the compression rollers out of a turret reference circle.

Preferably, the shaft mounting may further include releasable locking means such that clearance about the swiveling axis is prevented during operation of the rotary tableting machine.

For example, it may be preferable to firmly lock a compression roller shaft in a front area of the shaft mounting by means of a clamping bolt. By using a wedge, which is inserted into the compression roller shaft from behind, for example, an additional clearance-free attachment can be ensured. When swiveled into position for operation, in particular when a clamping bolt and wedge are used, there is a force-fitting and/or form-fitting connection which provides the necessary stability to absorb the compressive forces.

To release the lock and swivel out, the clamping bolt can be loosened so that the compression roller shaft is only attached to the shaft mounting via a swivel joint in the rear area. Tool-free fastening means are particularly preferred, which can be easily and securely released or closed manually without the use of (special) tools.

The swiveling bearing on the guide profile allows particularly easy maintenance, replacement or conversion of compression rollers or other components mounted in the shaft mountings, e.g. a turret removal arm.

Instead of a cumbersome and laborious lifting out of the entire compression station from the rotary tableting machine, the compression rollers mounted laterally on the guide profile can be swiveled outward individually for assembly or disassembly. The changeover or maintenance of the individual compression rollers can be carried out quickly and rapidly by one person in an exemplary ergometric position. Personnel and cost expenditures can be significantly reduced.

Such compression roller stations are therefore characterized by maximum flexibility for needs-oriented use. For example, corresponding compression roller shafts with optimized sensitivity can be effortlessly inserted for applications with different required compressive forces.

The provision of the swiveling capability leads to a particularly broad application potential of the shaft mountings. For example, it may also be preferable to use the swiveling bearing in the shaft mountings to realize a swiveling removal of a turret. For this purpose, it is only necessary for the supporting or lifting arm for the turret to have the same dimensions as a compression roller shaft, at least in sections. This allows the supporting or lifting arm for the turret to be locked swivelably in the shaft mountings in the same way in a force-fitting and/or form-fitting manner. Additional swiveling or lifting means are not required. Instead, the shaft mountings of the compression roller station can be used multifunctionally not for mounting various compression rollers, but other components such as dwell bars or even an entire turret.

The at least two, preferably at least four, shaft mountings with means for swivelable mounting thus enable a wide range of design variants and the provision of highly flexible rotary tableting machines. The rotary tableting machines according to the invention can thus not only cover the entire spectrum of compression variants, but are also characterized by a user-friendly, compact design.

This is particularly the case for the described compression roller station with at least two side faces on which a pair of upper and lower shaft mountings for compression roller shafts are arranged externally. Also for the provision of a guide profile with at least one side surface and a pair of shaft mountings for mounting compression roller shafts, the preferred laterally open shaft mountings offer a number of advantages.

In a further aspect, the invention therefore also relates to a compression roller station for rotary tableting machines having a guide profile which can be locked to the rotary tableting machine and which comprises at least one side surface on which a pair of upper and lower shaft mountings for compression roller shafts are arranged externally, the shaft mountings having a laterally open profile and preferably comprising means for the swivelable mounting of a compression roller shaft. Such a compression roller station with at least two shaft mountings does not necessarily offer the possibility of integrating up to four compression rollers. In terms of flexible replacement, maintenance or changeover options, the provision of the external, laterally open profiles of the shaft mountings, as described, already offers a number of advantages. This is particularly the case for especially preferred embodiments of the shaft mountings, such as a u-shaped cross section for accommodating cuboid compression roller shafts or the use of a swivel joint or pivot pin in a rear area of the shaft mounting.

In a preferred embodiment of the invention, the compression roller station may be provided together with at least two, preferably at least four, six, eight or more compression roller units and/or one or more compression rail units. Within the meaning of the invention, a compression roller unit preferably denotes a unit comprising a compression roller and a compression roller shaft. A compression rail unit within the meaning of the invention preferably denotes a unit comprising a dwell bar and a bearing shaft for the dwell bar. The shafts of the compression roller units or compression rail units preferably have identical dimensions at least in sections, which is designed to fit precisely in the shaft mountings.

However, the compression roller shafts can differ, for example, in their sensitivity or in the compression roller installed on them. Likewise, dwell bars with different lengths or shapes can be provided on bearing shafts of identical construction. Depending on the application, two, preferably four, of the compression roller units and/or compression rail units are selected and installed on the guide profile.

In further preferred embodiments of the invention, the compression roller station is additionally provided together with at least one bearing shaft for a turret or maintenance equipment, which is preferably designed at least in sections to fit precisely in one of the shaft mountings. Preferably, the bearing shaft can, for example, have a section which is identically dimensioned to the section of the compression roller shafts which is designed to fit precisely in the shaft mounting.

For example, if the shaft mounting is u-shaped and the compression roller shafts are cuboid, it is preferred to provide a bearing shaft that is also cuboid with identical dimensions. The bearing shaft can preferably be a support arm or lifting arm, which is also configured at one end for attachment to a turret or maintenance equipment.

In a further preferred embodiment of the invention, the compression roller station comprises sensors for measuring the compressive force. For this purpose, the compression roller shafts are preferably equipped with strain gauges for determining the compressive force. In the sense of the invention, strain gauges are preferably measuring devices for detecting stretching and/or compressing deformations. It is preferred that they change their electrical resistance even at low deformations, which is why they are particularly suitable as strain sensors. It is preferred that they be applied in a suitable manner, known to the average person skilled in the art, to components that deform minimally under load. Advantageously, this deformation or stretching results in a change in the resistance of the strain gauge bridge. In a particularly preferred embodiment, the lower compression roller shaft is provided with such a strain gauge. However, it may also be preferred that the upper compression roller shaft or both compression roller shafts are provided with strain gauges. The strain gauges preferably cover a force range of 20 to 200 kN in steps.

In another preferred embodiment, the invention relates to a rotary tableting machine comprising a described compression roller station.

The rotary tableting machine according to the invention is of the type of rotary tableting machines sufficiently known in the prior art as described at the beginning. The rotary tableting machine is therefore characterized by a turret comprising an upper and lower punch guide for receiving punches and a die plate with die openings for receiving the powdered material. After the die openings have been filled by a filling device, the material can be compressed into a pellet or tablet by the interaction of upper and lower punches. Upper and lower compression rollers, which are installed in the compression roller station described, are particularly preferred for imparting a compressive force to the upper and lower punches respectively.

The rotary tableting machine thus comprises a compression roller station according to the invention or preferred embodiments thereof for loading the punches. The person skilled in the art will recognize that preferred embodiments and advantages disclosed in connection with the compression roller station are equally applicable to the claimed rotary tableting machine.

In another preferred embodiment of the invention, the rotary tableting machine comprises a pre-compression station and a main compression station, wherein the upper and lower compression rollers of the pre-compression station are present mounted on a first side surface of the guide profile and the upper and lower compression rollers of the main compression station are present mounted on a second side surface of the guide profile. For this purpose, the upper and lower compression rollers are preferably present installed on compression roller shafts, which are insertable into the shaft mountings as described. Particularly preferably, the compression roller shafts are swivelably mounted so that lateral swiveling of the compression roller units out of the internal compression area is possible for maintenance or changeover purposes or for turret changes.

In a further preferred embodiment of the invention, the rotary tableting machine is characterized by a turret comprising a mounting for a support arm which can be inserted in one of the shaft mountings so that the turret can be swivelably attached to the guide profile via the support arm. As explained above, the shaft mountings of the compression roller station can advantageously also be used for the swivelable locking of further components of the rotary tableting machine. A multifunctional use for the removal, repair, cleaning and/or maintenance of the turret is particularly preferred.

It is known from EP 2 110 231 A2, for example, that a turret can be swiveled out of the compression chamber by means of a separate support arm. In its operating position, the turret is connected in a force-fitting manner to the drive system or the counter-bearing at the end face. For dismantling, the turret is connected to a support arm and swiveled outward around a frame-mounted column of the tableting machine set up for this purpose. For lifting or lowering the turret, a lifting device is preferably provided which can be integrated in the support arm or in the column.

With provision of the multifunctional compression roller station described, both a column fixed to the frame and a lifting device for changing the turret can be dispensed with. Instead, a simple bearing shaft or support arm can be connected to the turret on one side, preferably on the end face, and swivelably mounted in the shaft mounting on the other side. As a swivel joint, for example, a pivot pin is suitable, which is guided as described above, preferably through sockets in the rear area of a shaft mounting. The adjustment drives of the shaft mounting can be used to raise or lower the turret.

The capability for multifunctional application of the compression roller station thus permits a particularly slim design without sacrificing desirable features. This not only reduces the weight and cost of manufacturing the rotary tableting machines, but also their maintenance and repair requirements.

The capability for multifunctional application of the shaft mountings means that a large number of design variants are conceivable. For example, it may be preferable to replace a compression roller unit with a combined compression and dwell bar in the area of pre-compression.

In a further preferred embodiment, the rotary tableting machine therefore comprises a main compression station, wherein upper and lower compression rollers of the main compression station are attached a second side surface and wherein a dwell bar is attached to one of the shaft mountings of the first side surface of the guide profile. The first side surface preferably designates that side surface which is traversed first in the direction of rotation of the turret (area of the pre-compression), while the second side surface receives downstream components in the direction of rotation (area of the main compression station).

In a further preferred embodiment of the invention, the compression roller station is mounted on a carrier plate. Within the meaning of the invention, the carrier plate preferably designates a solid, flexurally and torsionally rigid plate on which the components of the rotary tableting machine are mounted. In particular, the carrier plate can represent the upper end of a drive base of the rotary tableting machine, while the lower end of a drive base towards the floor is referred to as the base plate.

Particularly preferably, the compression roller station is connected via a mounting flange to a central clamping unit and/or with connecting means, preferably screws, along the circumference of the guide profile of the carrier plate.

In the case of known compression roller stations, it is necessary to move the compression roller station on the carrier plate during servicing in order to convert it to another application. For this reason, it could be preferable to mount the compression roller station so that it can be moved or swiveled about a pivot point. The provision of air cushions for reducing the frictional force between a guide column and a carrier plate to support moving or swiveling is also known in the prior art from WO 2016/156306 A1, among others. Such a swivelable or movable bearing may also be preferred for the compression roller station according to the invention.

Advantageously, this can also be dispensed with, since the compression roller station does not have to be moved as a whole out of the turret chamber for maintenance, repair or conversion. Instead, the laterally mounted compression rollers are easily accessible from the side and, in a preferred embodiment, can also be easily swiveled individually.

In a further preferred embodiment of the invention, the compression roller station is therefore present permanently installed on a support plate, whereby the permanent installation means in particular that movement or swiveling is not possible without the use of tools.

In another preferred embodiment of the invention, the rotary tableting machine comprises a motor and/or transmission for axial adjustment of the shaft mountings in the guide profile, wherein the motor is not installed inside the compression roller station, but is preferably located below a support plate on which the compression roller station is mounted.

The relocation of a motor for the adjustment drives of the shaft mounting results in a particularly compact compression roller station in which, for example, there are only adjustment spindles which are connected to the motor via corresponding connections. The motor itself can preferably be located in the drive base below the carrier plate. In the prior art, compression roller stations are typically designed as self-sufficient elements whose connection to the carrier plate for removal, swiveling or movement can be quickly released. This is not necessary for the compression roller station according to the invention, such that connections between adjustment spindles and a motor or transmission, which may be difficult to disconnect, can also be dispensed with. This leads to greater design flexibility, as a result of which space-consuming components can be relocated from the compression roller station to the drive base.

Hereinafter, the invention will be explained in more detail by means of examples, without being limited to them.

BRIEF DESCRIPTION OF THE IMAGES

FIG. 1 Schematic diagram of a preferred compression roller station. Left: without compression roller units. Right: with compression roller units FIG. 2 Schematic diagram of a cross-section of a preferred compression roller station with compression roller units externally on both sides FIG. 3 Schematic diagram of a cross-section through a preferred guide profile FIG. 4 Schematic diagram of a detailed view of a preferred shaft mounting. A: perspective view, B: longitudinal section.

Figure 5:
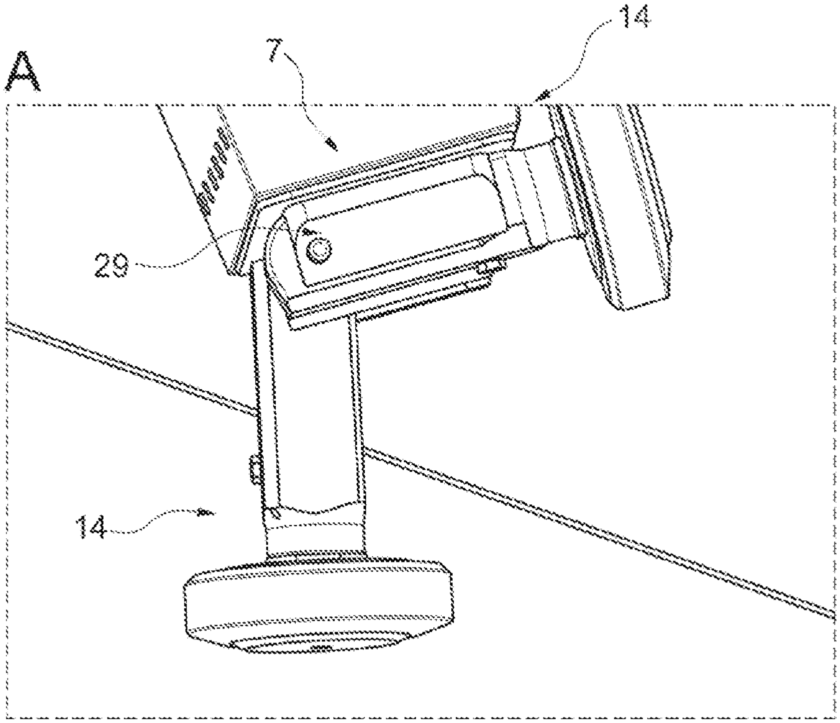
Figure 5:
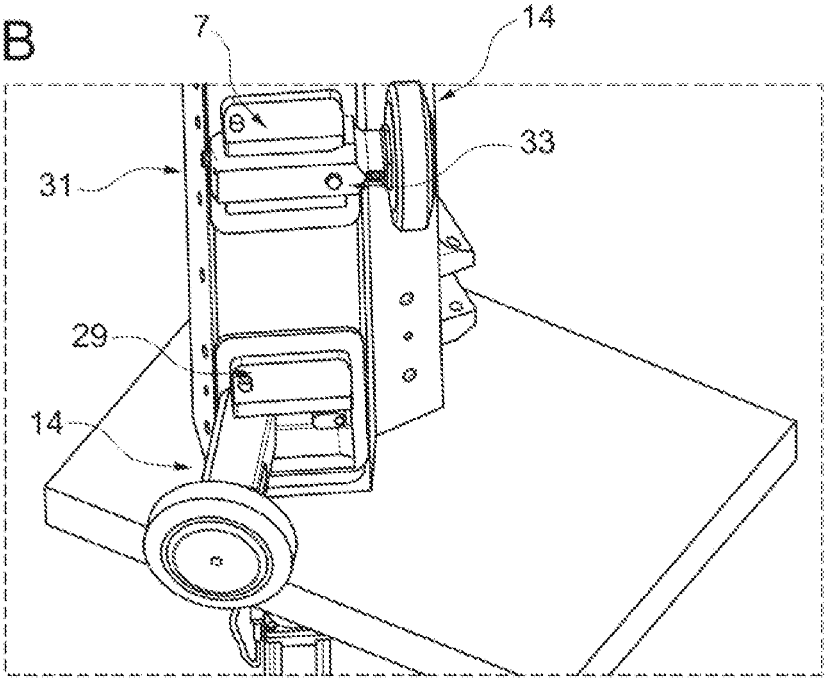

FIG. 5 Schematic diagram to illustrate swiveling a compression roller unit out from a shaft mounting. A: top view, B: perspective view.

Figure 6:
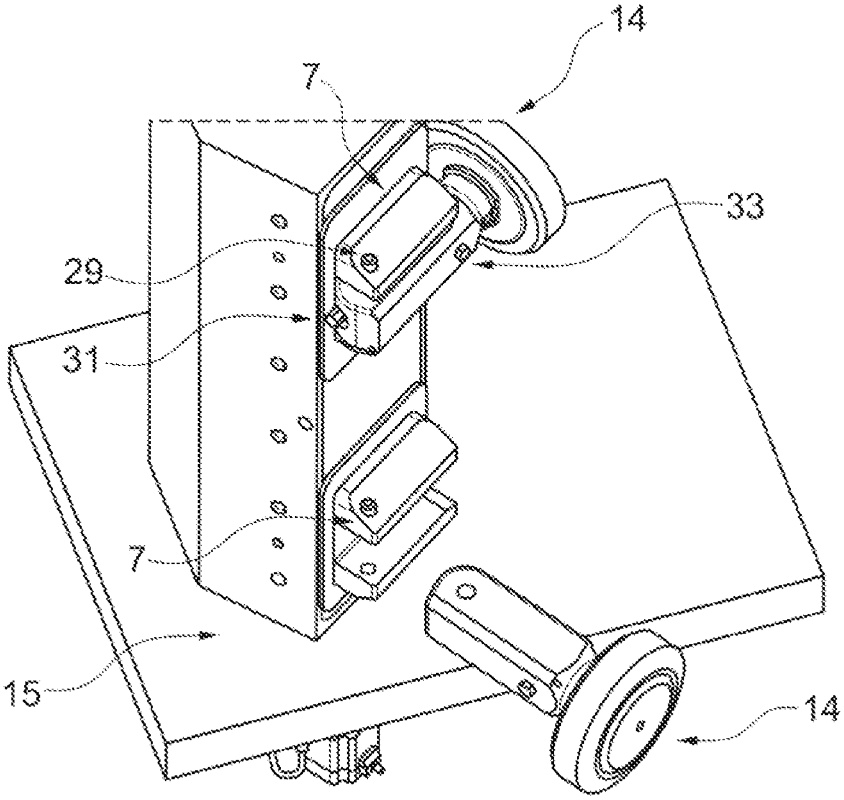

FIG. 6 Schematic diagram illustrating the removal of a compression roller unit from a shaft mounting.

Figure 7:
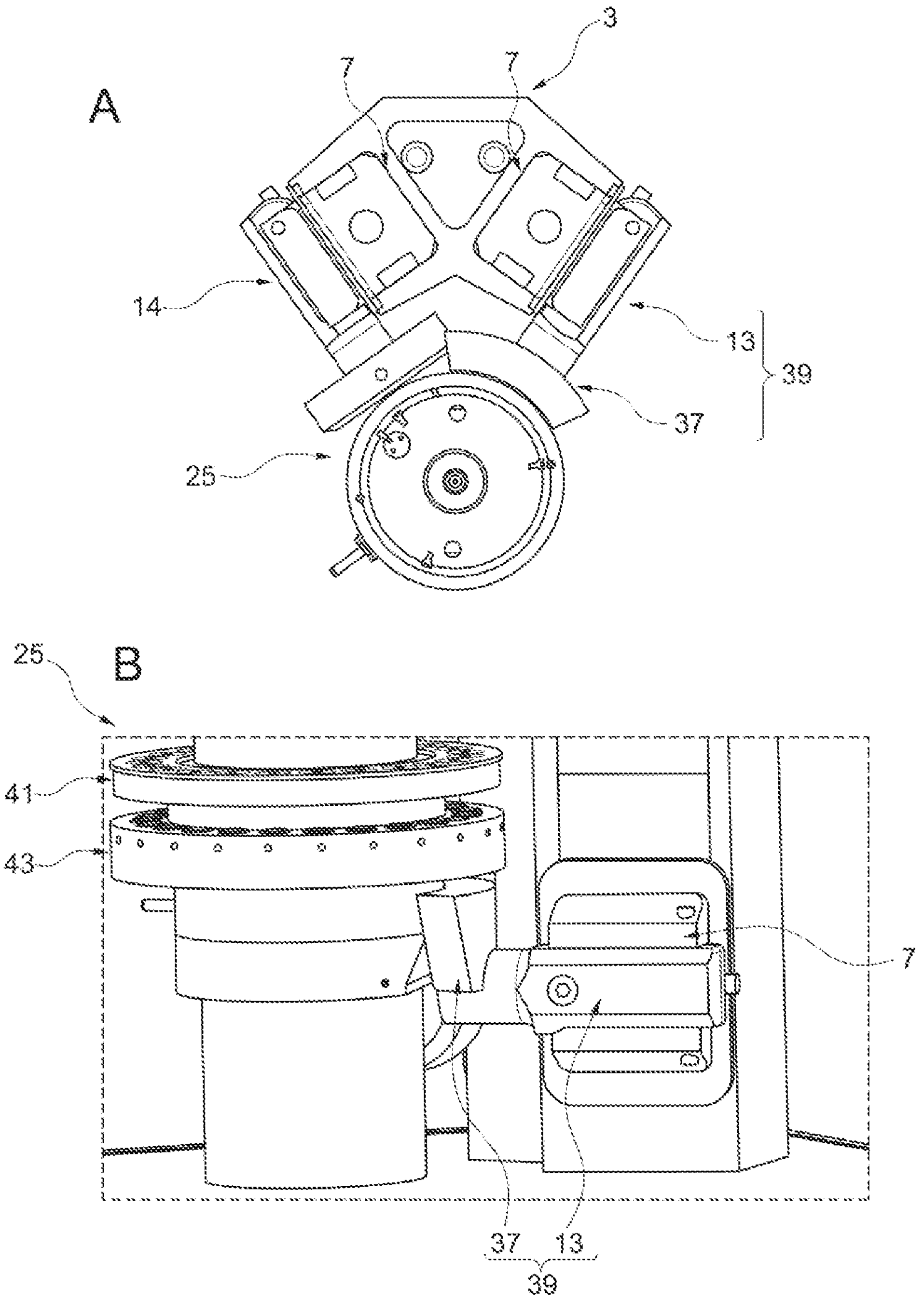
Figure 8:
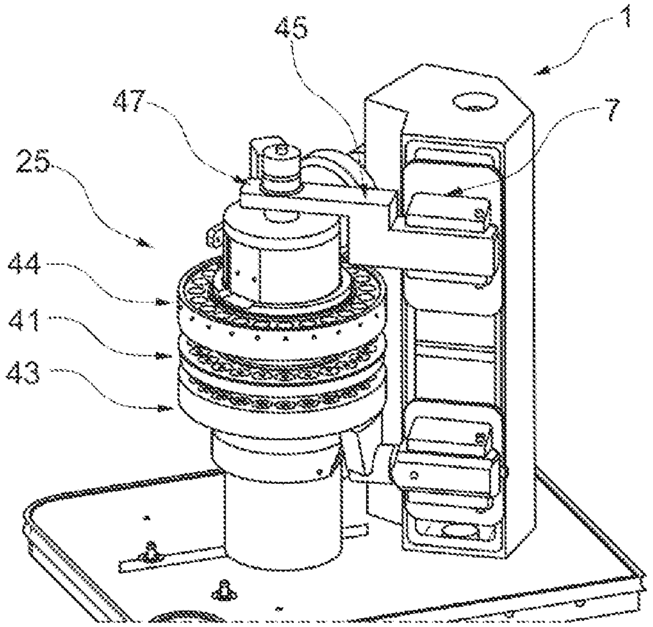
Figure 8:
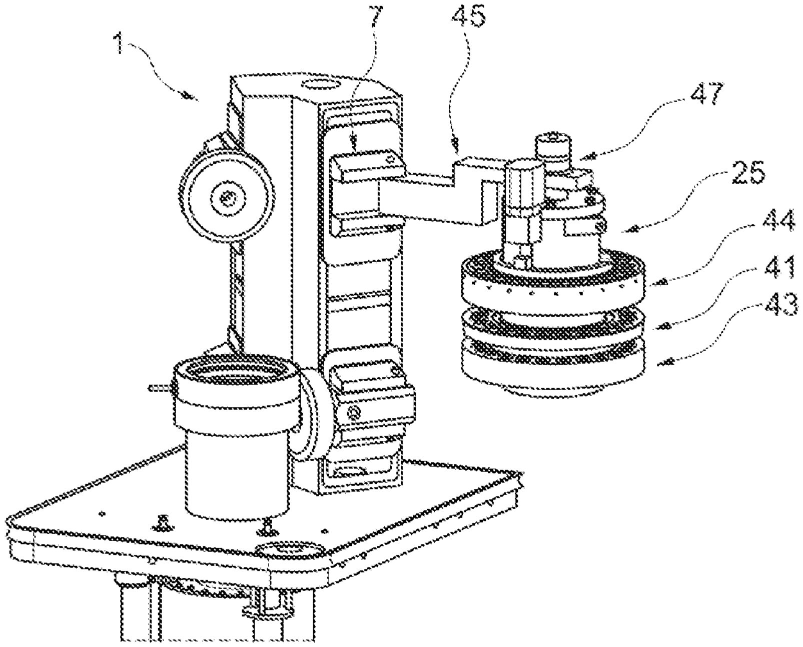

FIG. 7 Schematic diagram of a compression roller station with a combined compression rail and dwell bar in the area of the pre-compression FIG. 8 Schematic diagram illustrating the use of an upper shaft mounting of the compression roller station for swiveling out the turret.

DETAILED DESCRIPTION OF THE IMAGES

FIG. 1 shows a schematic diagram of a preferred embodiment of the compression roller station 1. The compression roller station 1 is characterized by a guide profile 3, which comprises two side surfaces 5, on each of which a pair of upper and lower shaft mountings 7 for compression roller shafts 13 are arranged externally, so that two pairs of compression rollers 11 or compression roller units 14 can be attached to the same guide profile 3. The guide profile 3 is designed as a free-standing support element or column and is used to support or guide the shaft mountings 7. As a result, the compressive forces occurring in the compression process are absorbed by the guide profile 3 and the adjustment spindles themselves. On the left, the compression roller station 1 is shown without compression roller units 14; on the right, with compression roller units 14, which are installed in the shaft mountings 7.

By attaching the shaft mountings 7 to the two side surfaces 5 of a guide profile 3, two pairs of compression rollers 11 can be provided in each case, whereby their spatial requirement on the turret circle is substantially determined by the extension of the compression rollers 11 themselves. The compression roller station 1 is thus characterized by an extremely compact design, whereby, for example, a main compression station and a pre-compression station can be provided in a very confined space.

Figure 2:
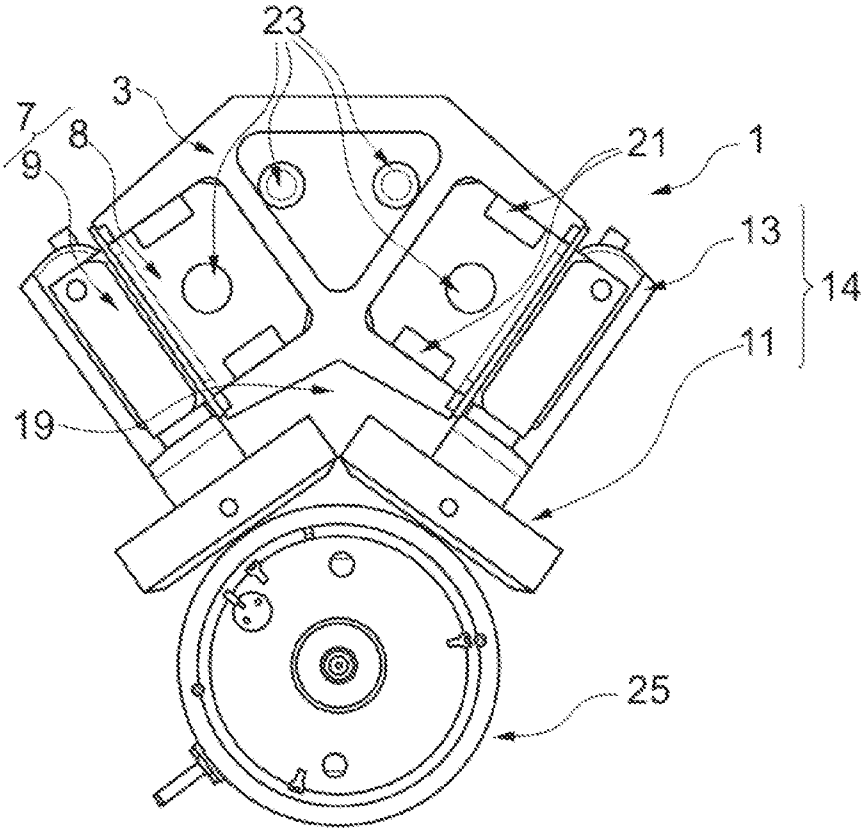

FIG. 2 shows a schematic diagram of a cross-section of a preferred compression roller station 1 with compression roller units 14 located externally on both sides, as is desirable, inter alia, for providing a pre-compression station and main compression station.

The shaft mountings 7 are designed to support or guide a compression roller shaft 13 or a bearing shaft for other components in the guide profile 3. For this purpose, the shaft mountings 7 comprise a mounting section 9 for locking a compression roller shaft or bearing shaft 11 and a bearing section 8 for guiding the shaft mounting 7 within the guide profile 3. As in the example shown, the bearing section 8 is preferably located inside the guide profile 3 on guide rails 21, while the mounting section 9 faces laterally outwards and is therefore easily accessible. By designing the shaft mountings 7 as solid, preferably monolithic components, these are mounted to absorb high compressive forces. Vertical adjustment of the shaft mountings 7 is preferably effected in the guide profile 3 by means of adjustment drives or the preferably illustrated adjustment spindles 23. In the illustrated embodiment, there are four adjustment spindles 23 with which the upper and lower shaft mountings 7 of the respective pairs can be moved vertically, i.e. along the height of the guide profile 3, individually and independently of one another.

For example, it may be preferable to use an adjustment drive to adjust the respective upper shaft mounting or upper compression roller and thus the insertion depth of an upper punch acted upon by the upper compression roller. Likewise, a lower shaft mounting or lower compression roller can preferably be adjusted relative to the upper shaft mounting or upper compression roller by means of a further adjustment spindle in order to define the height of the tablets to be produced. Furthermore, the upper and lower compression roller mountings can also be adjusted in relation to each other, for example to effect an adjustment of the compression zone.

Figure 3:
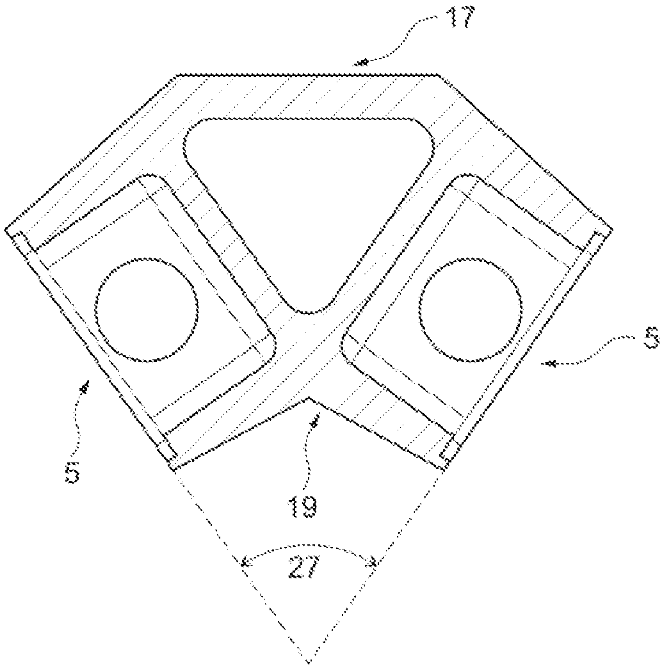

FIG. 3 shows a schematic diagram of a cross-section through a preferred guide profile 3. In cross-section, the guide profile 3 is preferably characterized by the presence of two side surfaces 5 which are preferably not parallel or perpendicular to each other. Instead, the side surfaces 5 preferably comprise an angle 27, which is preferably selected so that pairs of compression rollers attachable to the side surfaces act on a turret reference circle.

For this purpose, the cross-section of the preferred guide profile 3 resembles a circular ring segment in sections, with the two side surfaces forming the legs 5. As shown in the illustrated embodiment, in cross-section the front side 19 and rear side 17 can be straight in sections and emulate the arc shape of a circular arc. The front side 19 facing the turret has a smaller radius than the rear side 17 facing away from the turret. Accordingly, the front side 19 of the guide profile 3 shown is characterized by two surfaces, while the rear side 17 has three surfaces. Inside, the guide profile 3 is not solid, but has cavities for guiding the shaft mountings 7 and integrating other components, such as the adjustment drives (see FIG. 2).

Figure 4:
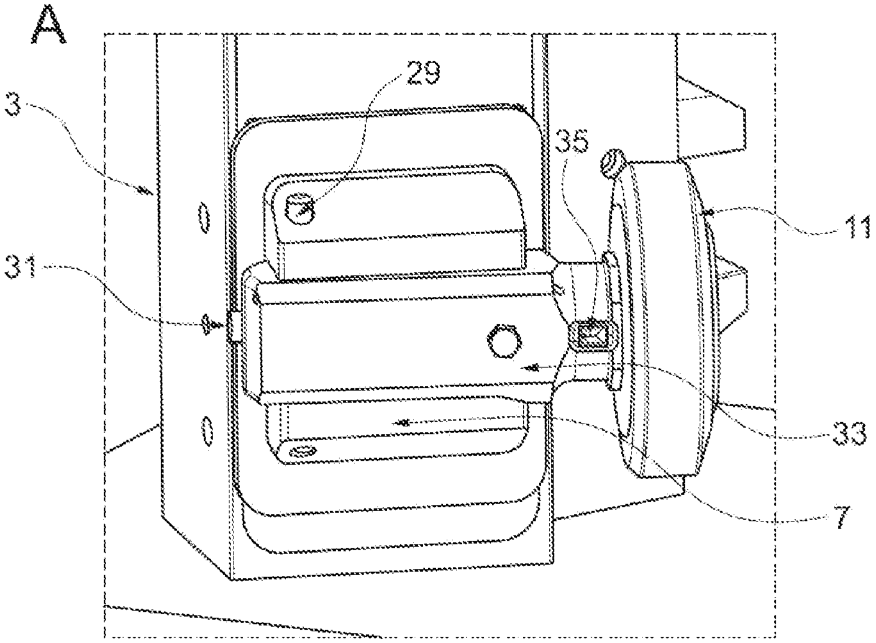
Figure 4:
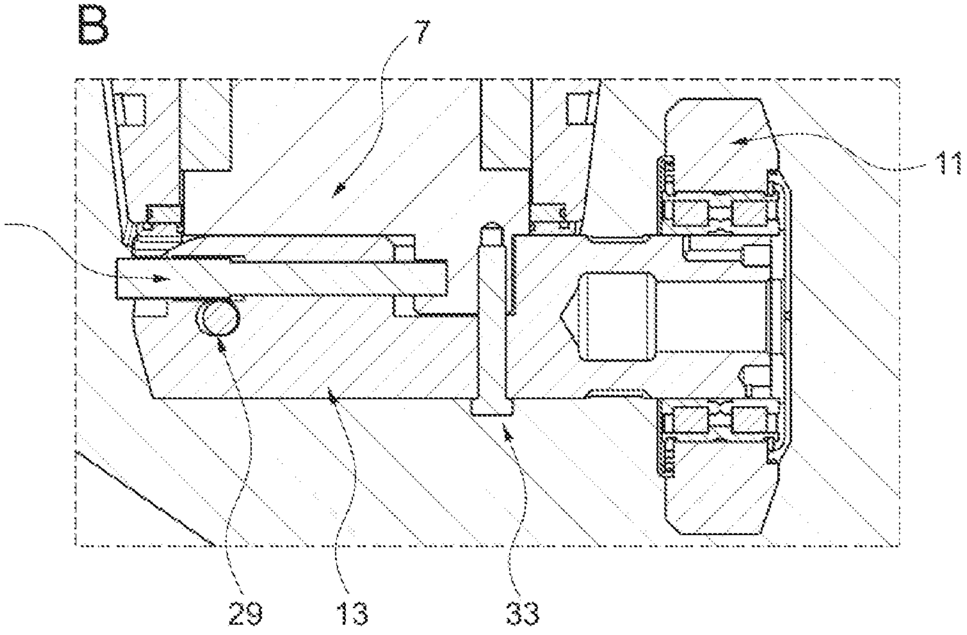

FIG. 4 is a schematic diagram of a detailed view of a preferred shaft mounting 7. It is evident that the shaft mounting 7 is characterized by a laterally open profile which is u-shaped in cross-section such that a cuboidal compression roller shaft 13 can be installed in a force-fitting and/or form-fitting manner. In addition, the shaft mounting 7 has means for a laterally outwardly swivelable mounting of the compression roller shaft 11, the pivot point being located in a rear region of the shaft mounting 7 and thus outside the guide profile 3. For this purpose, opposite sockets are provided in a rear region of the shaft mounting 7, through which a pivot pin 29 for the swivelable mounting of the compression roller shaft 13 can be guided.

In a front area of the shaft mounting 7, the compression roller shaft is firmly locked in the swiveled-in state by means of a clamping bolt 33. The use of a wedge 31, which is inserted into the compression roller shaft 11 from the rear, can additionally ensure clearance-free fixing. In the swiveled-in operating state, there is thus a force-fitting and/or form-fitting connection which has the necessary stability to absorb the compressive forces. To release the locking and for swiveling out, the wedge 31 and clamping bolt 33 can be loosened so that the compression roller shaft 11 is only fastened to the shaft mounting 7 via the swivel joint or the pivot pin 29 in the rear area.

FIG. 5 shows a schematic diagram illustrating the swiveling of the compression roller unit 14 out of a shaft mounting 7. While the upper compression roller unit 14 is firmly installed in the upper shaft mounting 7 by means of a wedge 31 and clamping bolt 33, the lower compression roller unit 14 has been swiveled out of the laterally open profile of the shaft mounting 7. FIG. 5A shows a top view, while FIG. 5B shows a perspective view.

For removal and, if necessary, replacement of a compression roller unit 14, the pivot pin 29 can also be removed, as shown in FIG. 6.

The laterally swivelable attachment thus allows compression roller units to be mounted or unmounted quickly and easily as required. It is not necessary to install or remove the entire compression roller station 1 for this purpose.

Advantageously, the shaft mountings 7 of the compression roller station 1 can also be used for the swivelable locking of further components of a rotary tableting machine.

For example, it may be preferable to replace a compression roller unit with a combined compression rail and dwell bar in the area of a pre-compression. The compression roller station 1 shown in the figure therefore comprises a compression rail unit 39 in the lower shaft mounting 7 of the first side surface of the guide profile 3, comprising a dwell bar 37 and a bearing axis or compression roller shaft 11.

A multifunctional use of the compression roller station 1 for the removal, repair, cleaning and/or maintenance of a turret 25 is particularly preferred.

FIG. 8 is a schematic diagram illustrating the use of an upper shaft mounting 7 of the compression roller station 1 for swiveling out a turret 25.

For this purpose, the turret 25 comprises a mounting 47 or fastening means for a support arm 45 which can be inserted in one of the shaft mountings 7 so that the turret can be attached to the guide profile 3 in a swiveling manner via the support arm 45. Analogous to the swiveling bearing of the compression roller shafts, a pivot pin is used as a swivel joint, which is guided in the rear area through sockets in the support arm 45 of the shaft mounting 7.

FIG. 8A shows the swiveled-in state, while FIG. 8B shows the swiveled-out state, for example for cleaning or maintenance purposes. Advantageously, the adjustment drives of the shaft mounting 7 can be used for raising or lowering the turret 25. A separate column fixed to the frame or a separate lifting device are no longer necessary.

It is noted that various alternatives to the described embodiments of the invention can be used to implement the invention and arrive at the solution according to the invention. Thus, the embodiments of the compression roller station and rotary tableting machine according to the invention are not limited to the foregoing preferred embodiments. Rather, a large number of design variants are conceivable which may deviate from the solution presented. The aim of the claims is to define the scope of protection of the invention. The scope of protection of the claims aims to cover the compression roller station and rotary tableting machine according to the invention as well as equivalent embodiments thereof.

LIST OF REFERENCE SIGNS

1 Compression roller station
3 Guide profile
5 Side surfaces of the guide profile
7 Shaft mounting
8 Bearing section for guiding the shaft mounting within the guide profile
9 Locating section for locking the compression roller shafts
11 Compression rollers
13 Compression roller shaft
14 Compression roller unit
15 Carrier plate
17 Rear of the guide profile
19 Front of the guide profile
21 Guide rails
23 Adjustment drives, in particular adjustment spindles
25 Turret
27 Angle comprised by the side surfaces
29 Swivel joint, especially pivot pin
31 Wedge
33 Clamping bolt
35 Strain gauge sensor
37 Dwell bar
39 Compression rail unit
41 Die plate
43 Lower punch guide
44 Upper punch guide
45 Support arm
47 Mounting for support arm, in particular on the end face of the turret

What is claimed is:

1. A compression roller station (1) for a rotary tableting machine comprising a guide profile (3) which can be locked to the rotary tableting machine and comprising a front surface (19) configured to face a turret (25) of the rotary tableting machine, wherein the guide profile (3) is present in the form of a free-standing support column and comprises, in addition to the front surface (19) configured to face the turret (25), a rear surface (17) configured to face away from the turret (25), and two side surfaces (5), wherein in a cross-section the front surface (19), the rear surface (17), and the two side surfaces (5) form a closed perimeter of the guide profile (3), whereby opposing ends of a first side surface of the two side surfaces (5) are connected to a first end of the front surface (19) and a first end of the rear surface (17), and opposing ends of a second side surface of the two side surfaces (5) are connected to a second end of the front surface (19) and a second end of the rear surface (17), wherein further on each of said two side surfaces (5) a pair of upper and lower shaft mountings (7) for compression roller shafts (13) are arranged outwards of the closed perimeter, so that two pairs of compression rollers (11) can be attached to the same guide profile (3), and wherein the side surfaces (5) comprise an angle (27) which is selected so that the two pairs of compression rollers (11) act on a turret reference circle, when attached to the side surfaces (5).

2. The compression roller station (1) according to claim 1 wherein on a first side surface (5) of said two side surfaces, there is a first pair of lower and upper compression rollers (11) forming a pre-compression station, and on a second side surface (5) of said two side surfaces, there is a second pair of lower and upper compression rollers (11) forming a main compression station.

3. The compression roller station (1) according to claim 1 wherein the angle (27) lies in the range from 10° to 120.

4. The compression roller station (1) according to claim 1 wherein upper and lower shaft mountings (7) of any of the two side surfaces (5) are mounted in the guide profile (3) so as to be vertically adjustable together and/or relative to one another.

5. The compression roller station (1) according to claim 1 wherein the compression roller station (1) comprises guide rails (21) within the guide profile (3), on which the upper and lower shaft mountings (7) are movable together and/or relative to one another.

6. The compression roller station (1) according to claim 1 wherein the compression roller station (1) has adjustment drives (23) for moving the pair of upper and lower shaft mountings (7) within the guide profile (3).

7. The compression roller station (1) according to claim 1 wherein the compression roller station (1) comprises a motor for adjusting the pair of upper and lower shaft mountings (7), wherein the motor is not present within the guide profile (3).

8. The compression roller station (1) according to claim 1 wherein the pair of upper and lower shaft mountings (7) have a laterally outwardly open shape.

9. The compression roller station (1) according to claim 1 wherein the pair of upper and lower shaft mountings (7) have a u-shaped mounting surface in cross-section, such that a cuboidal compression roller shaft (13) of said compression roller shafts can be locked in a force-fitting and/or form-fitting manner in any one of the pair of upper and lower shaft mountings (7).

10. The compression roller station (1) according to claim 1 wherein the pair of upper and lower shaft mountings (7) have means for a swivelable mounting of a compression roller shaft (13).

11. The compression roller station (1) according to claim 1 wherein the pair of upper and lower shaft mountings (7) have a laterally outwardly open shape and means for a swivelable mounting of a compression roller shaft (13), wherein the means for the swivelable mounting enables a swiveling of the compression rollers out of the turret reference circle.

12. The compression roller station (1) of claim 11 wherein the means for the swivelable mounting of the compression roller shaft (13) comprises a swivel joint.

13. The compression roller station (1) according to claim 12 wherein the swivel joint is positioned in a rear region of the shaft mounting in order to enable a swiveling of the compression roller out of the turret reference circle.

14. The compression roller station according to claim 11 wherein the pair of upper and lower shaft mountings comprise releasable locking means allowing for a firm locking of the compression roller shafts such that the compression rollers may act on the turret reference circle in an operation mode, wherein releasing the locking means allows for swiveling of the compression rollers out of the turret reference circle.

* * * * *